United States Patent
Robinson et al.

(10) Patent No.: US 10,975,823 B2
(45) Date of Patent: Apr. 13, 2021

(54) FASTENER-COMPONENT SUB-ASSEMBLY

(71) Applicant: Caterpillar Inc., Peoria, IL (US)

(72) Inventors: Aaron L. Robinson, Lafayette, IN (US); Jason S. Mershon, Crawfordsville, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/542,905

(22) Filed: Aug. 16, 2019

(65) Prior Publication Data

US 2021/0047991 A1 Feb. 18, 2021

(51) Int. Cl.
| | | |
|---|---|---|
| *F01N 13/10* | (2010.01) | |
| *F02M 35/10* | (2006.01) | |
| *F02M 69/46* | (2006.01) | |
| *F16L 23/18* | (2006.01) | |
| *F02M 35/104* | (2006.01) | |
| *F16L 23/024* | (2006.01) | |

(52) U.S. Cl.
CPC ........ *F02M 69/462* (2013.01); *F02M 35/104* (2013.01); *F02M 35/10085* (2013.01); *F16L 23/024* (2013.01); *F16L 23/18* (2013.01); *F02M 35/10144* (2013.01)

(58) Field of Classification Search
CPC .. F01N 13/10; F01N 13/1805; F01N 13/1855; F01N 2450/24; F02M 35/10078; F02M 35/10144
See application file for complete search history.

(56) References Cited

U.S. PATENT DOCUMENTS

| | | | |
|---|---|---|---|
| 4,066,058 A | * | 1/1978 | Anderkay .............. B62D 25/12 123/198 E |
| 4,491,037 A | * | 1/1985 | Bullock ............... B62D 55/125 384/130 |
| 5,309,626 A | | 5/1994 | Tolino |
| 5,765,835 A | | 6/1998 | Johnson |

(Continued)

FOREIGN PATENT DOCUMENTS

| | | |
|---|---|---|
| CN | 109374213 A | 2/2019 |
| JP | 2005133672 A | 5/2005 |
| KR | 20040045735 A | 6/2004 |

*Primary Examiner* — Long T Tran
(74) *Attorney, Agent, or Firm* — Oblon, McClelland, Maier & Neustadt

(57) ABSTRACT

A fastener-component sub-assembly has a body, a retaining member, and a fastener. The component has an interior surface, an exterior surface, and one or more openings extending from the interior surface to the exterior surface. A first opening of the one or more openings has an inlet and outlet, with an axis extending therethrough. The retaining member is disposed in the first opening of the one or more openings between the inlet and the outlet. The fastener is disposed in the first opening, and the fastener includes a narrow portion and a wide portion. The width of the narrow portion is less than the width of the wide portion. The fastener is movable in the first opening between an extended position and a recessed position. The narrow portion of the fastener is sized such the fastener is able to freely move along the axis and through the retaining member. The wide portion of the fastener is sized such that the fastener is prevented from moving toward the inlet of the first opening when the wide portion engages the retaining member.

17 Claims, 5 Drawing Sheets

(56) References Cited

U.S. PATENT DOCUMENTS

| | | | |
|---|---|---|---|
| 6,374,815 B1* | 4/2002 | Ness | F02M 35/04 |
| | | | 123/572 |
| 6,810,849 B1* | 11/2004 | Hirsch | F01M 1/04 |
| | | | 123/185.3 |
| 9,523,450 B2 | 12/2016 | Kobayashi et al. | |
| 10,060,530 B2* | 8/2018 | Kawai | F16J 15/106 |
| 2008/0128207 A1 | 6/2008 | Wilkins | |
| 2008/0298890 A1* | 12/2008 | Koike | F16B 5/0628 |
| | | | 403/408.1 |
| 2011/0152022 A1* | 6/2011 | Yoshimoto | F16H 7/08 |
| | | | 474/110 |
| 2011/0280682 A1* | 11/2011 | Egawa | F02M 35/10085 |
| | | | 411/337 |
| 2012/0024254 A1* | 2/2012 | Shibazaki | F02M 35/10078 |
| | | | 123/184.21 |
| 2015/0260317 A1* | 9/2015 | Yamamoto | F16L 23/18 |
| | | | 277/609 |
| 2017/0321410 A1 | 11/2017 | Connell | |

* cited by examiner

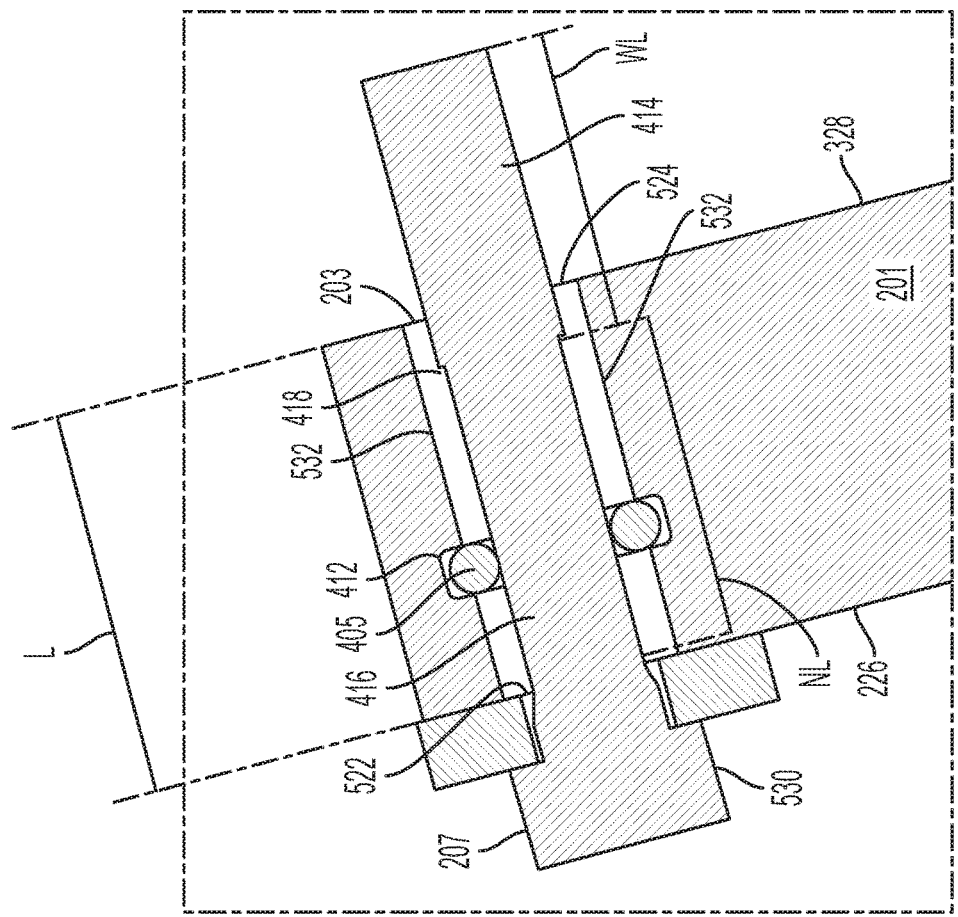
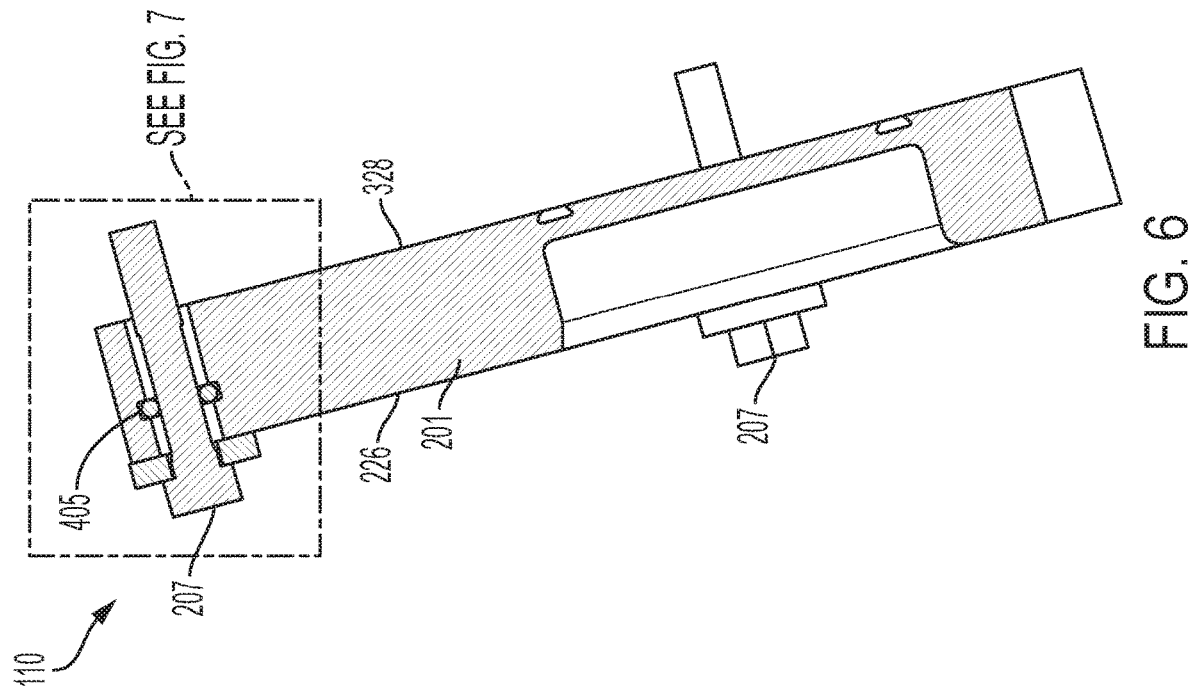
FIG. 7
FIG. 6

FASTENER-COMPONENT SUB-ASSEMBLY

TECHNICAL FIELD

The present disclosure relates generally to fastener-component sub-assemblies and, in particular, to fastener-component sub-assemblies used for engine applications.

BACKGROUND

Various types of engines include multiple components (e.g., plates, adapters, manifolds, conduits, elbows, tubes, flanges, etc.) that are connected to each other, such as, for example, by one or more fasteners (e.g., bolts). Some of these assemblies include components that are positioned at angles relative to other components. For example, engines used in marine applications often include various flanges that are positioned at a downward angle relative to a vertical axis of the engine, in which the angled flanges have bolt openings positioned at an angle that are configured for receiving a bolt such that the flange can be secured to another component of the engine. Because the bolt openings are positioned at an angle, the bolts are inserted into the bolt openings at an angle to secure the flange to the other component(s).

Bolts can be secured within a bolt opening with an O-ring positioned between the bolt and an inner wall of the bolt opening to provide a seal that prevents liquid from moving through the bolt opening. For example, U.S. Patent Publication No. 2008/0128207, filed on Aug. 23, 2007, describes a drain bolt that that includes an enlarged primary flange and a pair of reduced diameter flanges, in which the reduced diameter flanges hold an O-ring captive between them.

SUMMARY

An exemplary embodiment of an engine includes a cylinder block, a cylinder head, a manifold, a conduit, and a fastener-component sub-assembly. The cylinder block houses one or more components of the engine, and the cylinder head is connected to the cylinder block. The conduit fluidly connects the cylinder block to the manifold. The fastener-component sub-assembly includes a body, a retaining member, and a fastener. The component has an interior surface, an exterior surface, and one or more openings extending from the interior surface to the exterior surface. A first opening of the one or more openings has an inlet and outlet, with an axis extending therethrough. The retaining member is disposed in the first opening between the inlet and the outlet. The fastener is disposed in the first opening, and the fastener includes a narrow portion and a wide portion. The width of the narrow portion is less than the width of the wide portion. The fastener is movable in the first opening between an extended position and a recessed position. The narrow portion of the fastener is sized such the fastener is able to move along the axis and through the retaining member. The wide portion of the fastener is sized such that the fastener is prevented from moving toward the inlet of the first opening when the wide portion engages the retaining member.

An exemplary embodiment of a fastener-component sub-assembly has a body, a retaining member, and a fastener. The component has an interior surface, an exterior surface, and one or more openings extending from the interior surface to the exterior surface. A first opening of the one or more openings has an inlet and outlet, with an axis extends therethrough. The retaining member is disposed in the first opening between the inlet and the outlet. The fastener is disposed in the first opening, and the fastener includes a narrow portion and a wide portion. The width of the narrow portion is less than the width of the wide portion. The fastener is movable in the first opening between an extended position and a recessed position. The narrow portion of the fastener is sized such the fastener is able to move along the axis and through the retaining member. The wide portion of the fastener is sized such that the fastener is prevented from moving toward the inlet of the first opening when the wide portion engages the retaining member.

An exemplary method of manufacturing a multi-component product includes providing a first component and a second component. The first component has a fastener-component sub-assembly that includes a body having one or more openings, a retaining member disposed in a first opening of the one or more openings, and a fastener disposed in the first opening such that the fastener is able to move axially through the opening. The fastener of the fastener-component sub-assembly has a narrow portion and a wide portion, and the fastener and the retaining member are disposed within the first opening such as the retaining member prevents movement of the fastener toward an inlet of the opening when the wide portion of the fastener engages the retaining member. The method further includes positioning the first component adjacent to the second component such that the fastener-component sub-assembly is positioned to connect the first component to the second component. In addition, the method includes connecting the fastener of the fastener-component sub-assembly to the second component to connect the first component to the second component.

BRIEF DESCRIPTION OF THE DRAWINGS

FIG. 6 is a cross-sectional side view of the fastener-component sub-assembly of FIG. 2 taken along the line 4-4 of FIG. 2, in which the bolt is in a recessed position within the component;

FIG. 7 is a partial cross-sectional view of the fastener-component sub-assembly of FIG. 2, in which the bolt is in a recessed position within the component.

DETAILED DESCRIPTION

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments.

Inventions within the scope of this application may include additional features, or may have less features, than those shown in the exemplary embodiments.

The present application discloses fastener-component sub-assemblies for use in manufacturing multi-component products (e.g., engines). The fastener-component sub-assemblies allow the multi-component products to be assembled in a quick manner without delays resulting from fasteners being displaced from a component prior to connection. The fastener-component sub-assemblies can take a variety of different forms and can be included on a variety of different types of components (plates, adapters, manifolds, conduits, elbows, tubes, flanges, etc.)

Figure 1:
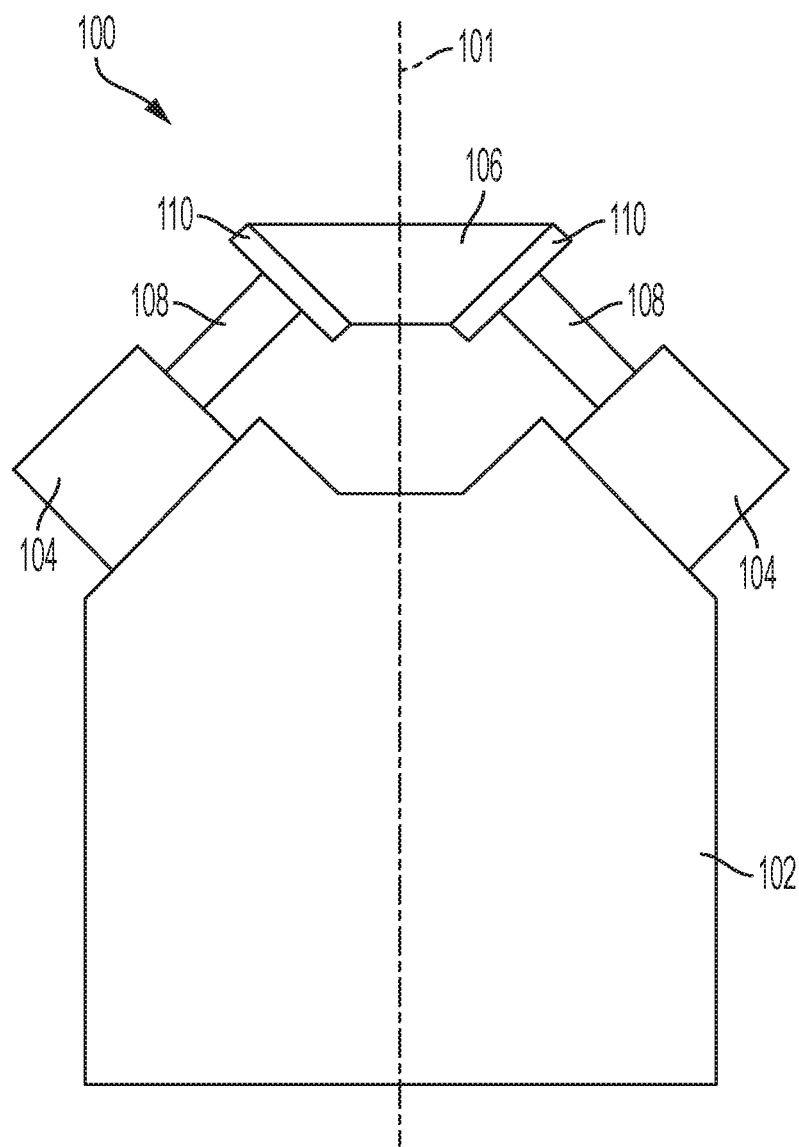
FIG. 1 is a schematic drawing of an exemplary embodiment of an engine that includes a fastener-component sub-assembly.
Figure 3:
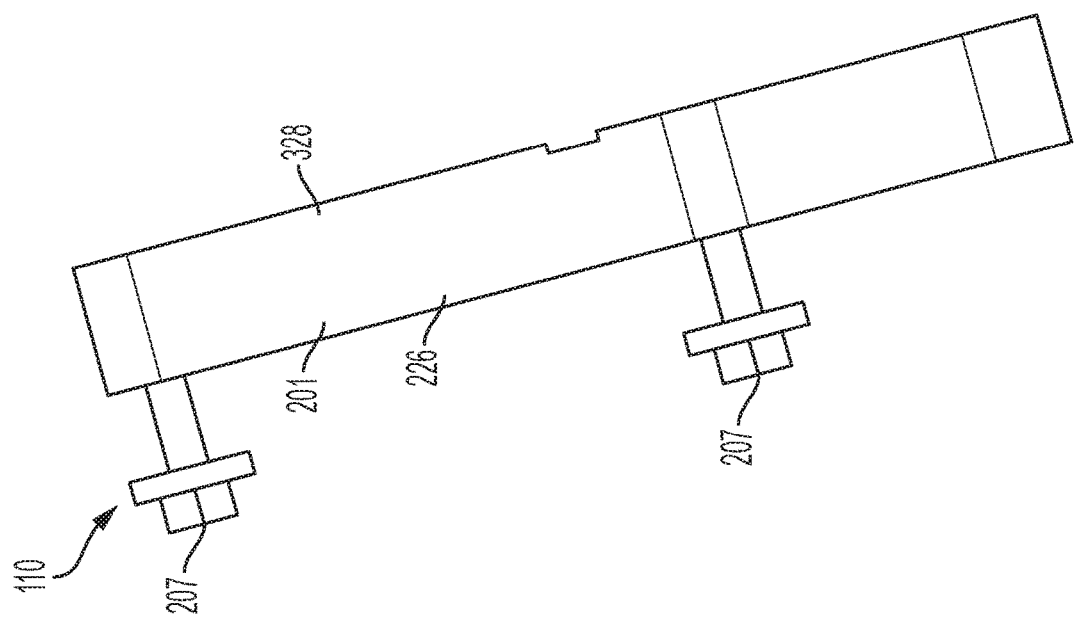
FIG. 3 is a side view of the fastener-component sub-assembly of FIG. 2.
Figure 2:
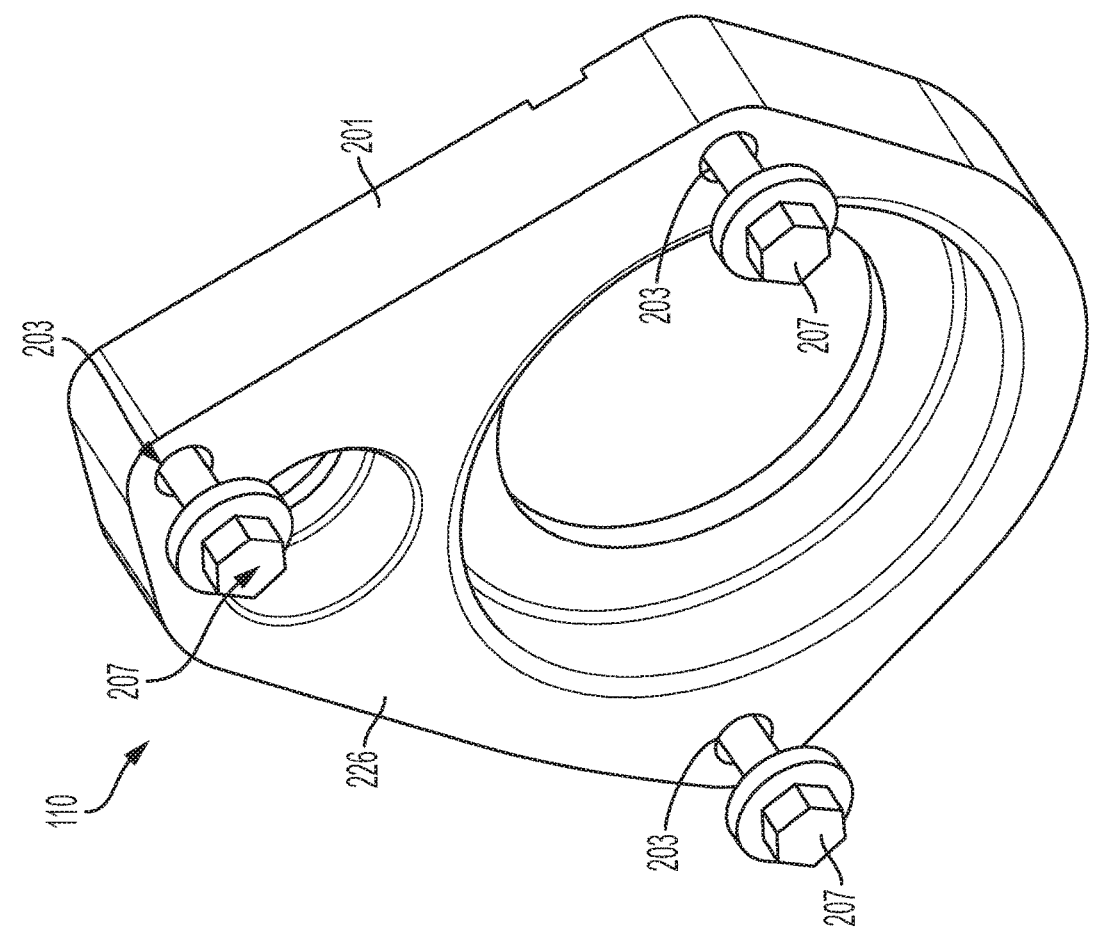
FIG. 2 is a perspective view of an exemplary embodiment of a fastener-component sub-assembly.

FIG. 1 illustrates an exemplary embodiment of an engine 100 that includes at least one fastener-component sub-assembly 110. In various embodiments, the engine 100 includes a cylinder block 102, cylinder heads 104 connected to the cylinder block 102, a manifold 106, conduits 108 (e.g., elbows) for fluidly connecting the cylinder head 104 to the manifold 106, and fastener-component sub-assemblies 110 for connecting the conduits 108 to the manifold 106. The cylinder block 102 houses one or more components (e.g., cylinders, coolant passages, oil galleries, crankcase, etc.) of the engine 100. The cylinder head 104 is disposed on top of the cylinder block 102 and engages the cylinders disposed in the cylinder block to form a combustion chamber. The cylinder head 104 also includes passages that allow for air and fuel to move to the cylinder, as well as passages that allow exhaust to escape the cylinder. The manifold 106 is in fluid communication with the cylinder head 104 and, consequently, the cylinders housed in the cylinder block 102. In the illustrated embodiment, the conduit 108 fluidly connects the manifold 106 to the cylinder head 104. The manifold 106 can be an intake manifold for supplying air and fuel to the cylinder head 104 through the conduit 108, or the manifold 106 can be an exhaust manifold that collects exhaust gases from the cylinder head 104 through the conduit 108. The fastener-component sub-assembly 110 connects the conduit 108 to the manifold 106 such that the conduit 108 is in fluid communication with the manifold 106. In certain embodiments, the manifold 106, conduits 108, and the fastener-component sub-assemblies 110 are included in a water-cooled exhaust system of the engine 100 used in a marine application.

As shown in the illustrated embodiment, the fastener-component sub-assembly 110 may be disposed at a downward angle relative to a vertical axis 101 of the engine 100. The engine 100 can include any number of the fastener-component sub-assemblies 110, such as, for example, two or more, three or more, four or more, five or more, six or more, seven or more, eight or more, etc. The fastener-component sub-assembly 110 includes a body having one or more openings and one or more fasteners (e.g., bolts, screws, etc.) disposed in the one or more openings such that the fasteners are securely retained in the openings, in which the fasteners are movable between an extended position and a recessed position. The body can be, for example, a plate, a flange, adapter, manifold, elbow, tube, or any other suitable type of component. The fasteners can be secured in the openings by, for example, a retaining member (e.g., an O-ring, a compressible rubber material, a compressible soft plastic material, or the like). The fastener-component sub-assembly 110 is advantageous because it reduces the time required to assemble a multi-component product (e.g., an engine) because the fasteners are properly positioned and securely retained within the openings of the component prior to assembly of the multi-component product. In addition, the fastener-component sub-assembly 110 prevents delays during the assembly of a multi-component product resulting from fasteners falling out of the openings of a component (e.g., as a result of the component being disposed at an angle).

Referring to FIGS. 2 through 7, an exemplary embodiment of fastener-component sub-assembly 110 includes a body 201, one or more openings 203 extending through the body 201, one or more retaining members 405 (FIGS. 4-7) disposed in the openings 203, and one or more fasteners 207. The body 201 can be, for example, a plate, a flange, adapter, manifold, elbow, tube, or any other suitable type of component. The body 201 can be made of, for example, cast iron, aluminum, any other suitable metal, plastic, etc. The openings 203 have an inlet 522 (FIG. 5) on an exterior surface 226 of the body 201, and the openings 203 extend through the body 201 to an outlet 524 (FIG. 5) on an interior surface 328 of the body 201. The openings 203 are sized to receive the fasteners 207 such that the fasteners can move through the openings 203. In certain embodiments, the openings 203 can include a groove or channel 412 (FIGS. 4-7) that extends into a wall 532 of the opening 203, in which the channel 412 is configured for receiving the retaining member 405. In the illustrated embodiment, the channel 412 is circumferential. The channel 412 can take any suitable form or shape for receiving the retaining member 405. In alternative embodiments, rather than the opening 203 having a channel, the retaining member 405 is positioned within the opening 203 by a friction fit connection, an adhesive, or by any other means that allows the retaining member 405 to be properly positioned within the opening 203.

The fasteners 207 are disposed in the openings 203 and positioned to engage the retaining member 405 such that the fasteners 207 can be moved between an extended position (as shown in FIGS. 2-5) and a recessed position (as shown in FIGS. 6-7). In the illustrated embodiment, the retaining member 405 is an O-ring. The retaining member 405 can be, however, any type of compressible material, such as, for example, a compressible rubber material, a compressible soft plastic material, etc. In addition, the retaining member 405 can take any suitable form or shape that is capable of engaging the fastener 207 to retain the fastener within the opening 203. In alternative embodiments, the retaining member 405 may be made of a rigid material.

Figure 5:
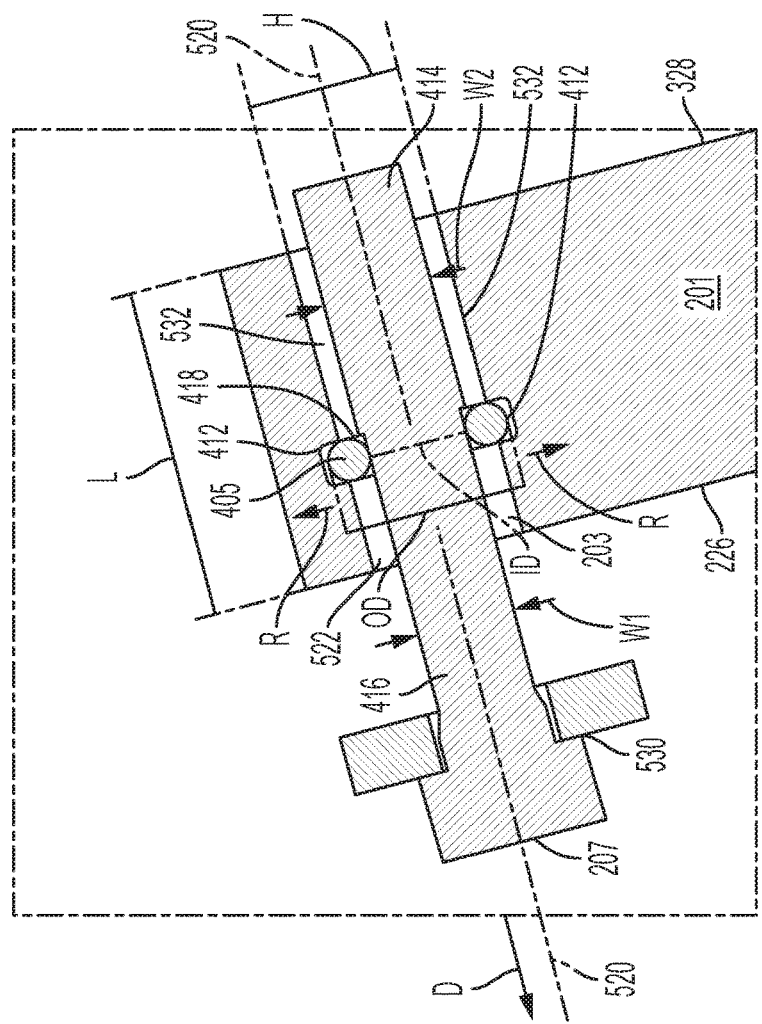
FIG. 5 is a partial cross-sectional view of the fastener-component sub-assembly of FIG. 2, in which the bolt is in an extended position within the component.
Figure 4:
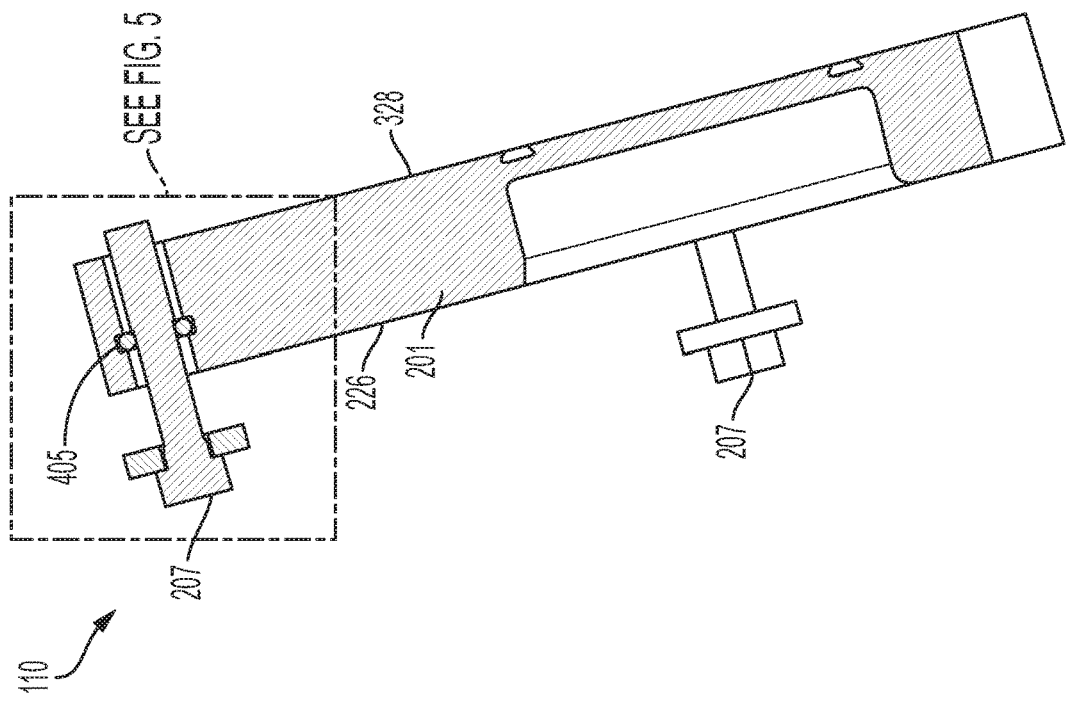
FIG. 4 is a cross-sectional side view of the fastener-component sub-assembly of FIG. 2 taken along the line 4-4 of FIG. 2, in which the bolt is in an extended position within a component.

Referring to FIGS. 4 and 5, the fasteners 207 are shown in the extended position. In the illustrated embodiment, the fasteners 207 include a head 530, a wide portion 414, a narrow portion 416, and a shoulder 418 positioned between the wide portion 414 and the narrow portion 416. Referring to FIG. 5, the narrow portion 416 has a width W1, and the wide portion 414 has a width W2 that is greater than the width W1 of the narrow portion 416. In certain embodiments, the width W2 of the wide portion 414 can take the form of any standard size bolt fitting known to one having ordinary skill in the art, and the width W1 can be any suitable size that is less than the standard size of the width W1. In some embodiments, the width W2 of the wide portion 414 is variable along the length of the wide portion 414. The narrow portion 416 has a length NL and the wide portion 414 has a length WL. In some embodiments, the length NL of the narrow portion 416 is greater than the length WL of the wide portion 414. In certain embodiments, the length NL of the narrow portion 416 of the fastener 207 can be greater than the length L of the opening 203.

The opening 203 may have a width H that is larger than the width W2 of the wide portion 414 of the fastener 207 such that the wide portion 414 can move through the opening 203. The opening 203 may take any suitable form or shape. In the illustrated embodiment, the opening 203 has a circular shape with a diameter equal to the width H. In certain embodiments, the fastener 207 may be able to move in the radial direction R (or, for non-circular openings, in a direction along the width H of the opening) within the opening 203. In the illustrated embodiment, the width H of the opening 203 is constant along the entire length L of the opening 203. In alternative embodiments, the width H of the opening 203 may vary along the length L of the opening 203.

In the illustrated embodiment, the O-ring 405 has an inner diameter ID and an outer diameter OD. The outer diameter OD of the O-ring 405 is sized to fit in the channel 412 of the opening 203 such that the opening of the O-ring 405 (which is defined by the inner diameter ID of the O-ring 405) is aligned on an axis 520 that extends through the inlet 522 and the outlet 524 of the opening 203. The channel 412 and the O-ring 405 can be positioned at any location along the length L of the opening 203.

The inner diameter ID of the O-ring 405 is sized to receive the narrow portion 416 of the fastener 207 such that the narrow portion 416 can freely move through the O-ring 405 along the axis 520. In some embodiments, the inner diameter ID of the O-ring 405 is less than the width W1 of the fastener 207. In other embodiments, the inner diameter ID of the O-ring 405 is greater than the width W1 of the fastener 207, but the O-ring 405 is compressible and configured to allow the narrow portion 416 of the fastener to move through the O-ring 405. In some embodiments, the inner diameter ID of the O-ring 405 is substantially equal to the width W1 of the fastener 207. In certain embodiments, the O-ring 405 forms a seal around the fastener 207 to prevent liquid from moving entirely through the opening 203. Because the width H of the opening 203 is larger than the width W1 of the narrow portion 416 of the fastener 207, the fastener 207 may move in the radial direction R. In these situations, the O-ring 405 (or other retaining member) is configured to compress to allow for this radial movement of the fastener 207 without substantial forces being applied to the fastener 207 by the O-ring 405. In alternative embodiments, however, the O-ring 405 (or other retaining member) may be made of a rigid material.

The inner diameter ID of the O-ring 405 is also sized to prevent the wide portion 414 of the fastener 207 from moving through the O-ring. That is, the fastener 207 can move through the O-ring 405 along the axis 520 in the direction D until the wide portion 414 engages the O-ring 405, which prevents further movement of the fastener 207 in the direction D. This engagement between the wide portion 414 of the fastener 207 and the O-ring 405 prevents the fastener 207 from falling out of the inlet 522 of the opening 203 in the direction D. In some embodiments, the shoulder 418 engages the O-ring 405, and, in other embodiments, other portions of the wide portion 414 engage the O-ring 405.

Referring to FIGS. 6 and 7, the fasteners 207 are shown in the recessed position. While in the recessed position, the head 530 of the fastener 207 may be pressed against the exterior surface 226 of the body 201, and at least a portion of the fastener 207 extends through the outlet 524 of the opening 203 such that the fastener 207 can be connected to another component (not shown). In certain embodiments, the entire wide portion 414 of the fastener 207 and some of the narrow portion 416 of the fastener 207 extends through the outlet 524 of the opening 203 when the head 530 is engaging the body 201. The engagement between the head 530 of the fastener 207 and the body 201 prevents the fastener 207 from moving entirely out of the opening 203 through the outlet 534. The fastener 207 can be connected to another component by any suitable means, such as, for example, a threaded connection, a snap fit connection, a friction fit connection, or any other suitable connection known to one skilled in the art.

Figure 8:
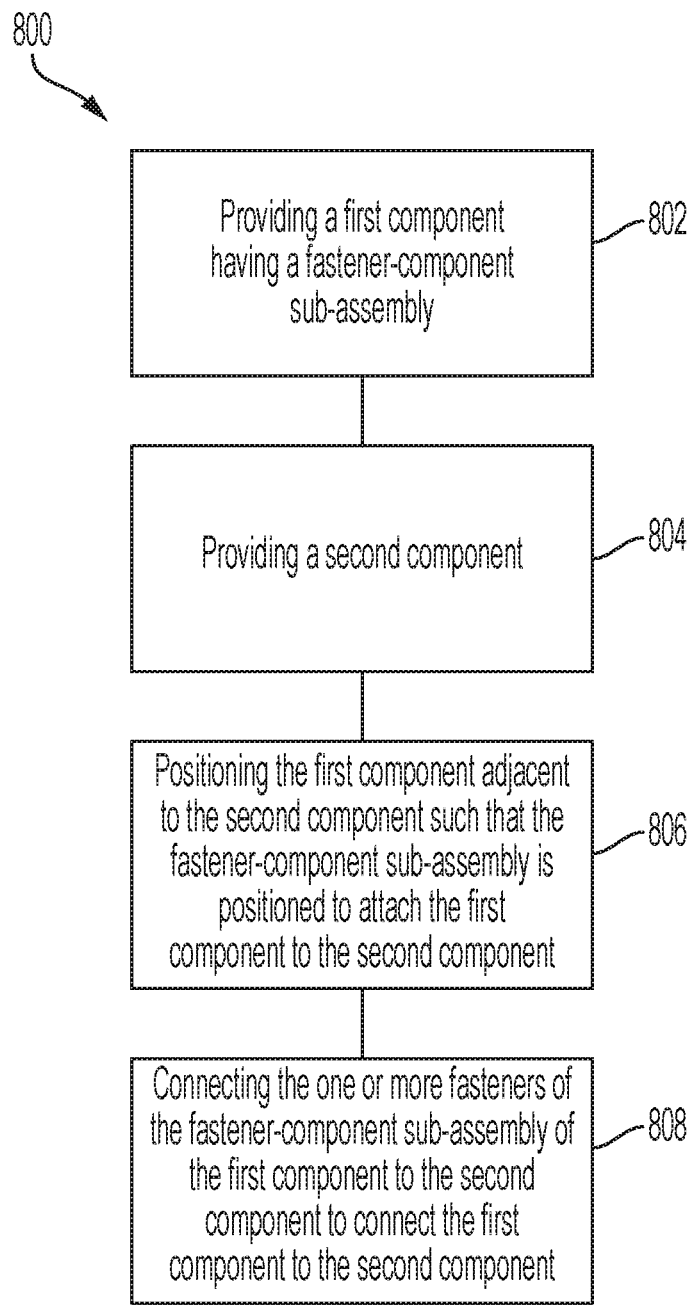
FIG. 8 illustrates an exemplary method of manufacturing a multi-component product.

FIG. 8 illustrates an exemplary method 800 of manufacturing a multi-component product. The method 800 includes providing a first component and a second component (as shown in boxes 802 and 804). The first component has a fastener-component sub-assembly configured for connecting the first component to the second component. The fastener-component sub-assembly can take any suitable form such as, for example, any form described in the present application. The method 800 further includes positioning the first component adjacent to the second component such that the fastener-component sub-assembly is positioned to attach the first component to the second component (as shown in box 806). For example, the first component can be positioned such that fasteners of the fastener-component sub-assembly are aligned with openings of the second component, and the fasteners can be moved from an extended position to a recessed position such that the fasteners are inserted into the openings of the second component and tightened (e.g., by a threaded connection) or otherwise secured to the second component. In certain embodiments, the method 800 may include positioning the first component adjacent to the second component such that the fastener-component sub-assembly of the first component is disposed at an angle relative to a vertical axis of the multi-component product (e.g., axis 101 shown in FIG. 1). The method 800 also includes connecting one or more fasteners of the fastener-component sub-assembly to the second component to connect the first component to the second component (as shown in box 808).

INDUSTRIAL APPLICABILITY

During the manufacturing of various assemblies (e.g., engine assemblies), one or more components (e.g., plates, adapters, manifolds, conduits, elbows, tubes, flanges, etc.) may be positioned at a downward angle relative to other components of the assembly. In some instances, these components are positioned at downward angles relative to each other prior to the components being connected to each other. In these instances, the fasteners used to connect these components may be positioned within openings of the components and, consequently, disposed at an angle prior to connection. These angled, non-connected fasteners often fall out of the openings, thus leading to a delay in the manufacturing process.

For example, referring to the engine 100 shown in FIG. 1, the manifold 106 is fluidly connected to the cylinder head 104 by a conduit 108. Typical engines 100 can include a component that connects the conduit 108 to the manifold 106, and this component can be positioned similarly to the fastener-component sub-assembly 110 shown in FIG. 1 (e.g., positioned at a downward angle relative to a vertical axis 101 of the engine 100). In these situations, fasteners used to connect the component and conduit 108 to the manifold 106 often fall out of the component, which causes a delay in the manufacturing process because a user would have to pick up the fastener from the ground surface and place the fastener in a position to connect the component and conduit 108 to the manifold 106. The fastener-component sub-assemblies 110 described herein, however, prevent the displacement of fasteners during the manufacturing process.

Referring to FIGS. 1-7, the disclosed fastener-component sub-assembly 110 includes a body 201 having openings 203 for receiving fasteners 207. These fasteners 207 can move through the openings 203 such that the fasteners 207 can move between an extended position in a recessed position. The fasteners 207, however, are prevented from falling out of the openings 203 because of the engagement between the fasteners 207 and retaining member 405 disposed within the opening 203. In certain embodiments, the fasteners 207 have a narrow portion 416 and a wide portion 414. The narrow portion 416 is sized to move through the retaining member 405 such that the fastener 207 can freely move between the extended position and the recessed position, and the wide portion 414 is sized larger than the interior diameter ID of the retaining member 405 such that the wide portion 414 engages the retaining member 405 to prevent the fastener 207 from falling out of the opening 203. This allows the angled component to be positioned for connection to the assembly without any concern that the fasteners 207 will fall out of the openings 203 and delay the manufacturing time. In some embodiments, the opening 203 includes a channel 412 positioned between an inlet 522 and an outlet 524 of the opening 203, and this channel 412 is configured to receive the retaining member 405 such that the retaining member 405 remains in a desired position for engaging the fastener 207.

When the recessed position, the fasteners 207 are configured to and properly positioned to connect the body 201 to another component of the assembly. The pre-placement of the fasteners within the openings of the fastener-component sub-assembly is advantageous because it eliminates the need of a user to insert and properly position the fasteners within the body of the component.

While the fastener-component sub-assembly 110 is described as being part of an angled component for an engine assembly, it should be understood that this sub-assembly 110 can be used in various other applications. In particular, the disclosed fastener-component sub-assembly 110 can be used in any type of assembly that includes the connection of one or more components by fasteners. In addition, while this fastener-component sub-assembly 110 is described as being advantageous for components being positioned at a downward angle relative to other components to prevent fasteners from falling out of the openings of the components, it should also be understood that this sub-assembly 110 can also be used for the connection of non-angled or upward-angled components, and is also advantageous for the connection of non-angled or upward-angled components because the fasteners 207 are pre-placed in the desired position for connection of the components, rather than the fasteners needing to be inserted into the components by a user.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

ELEMENT LIST

Element
Number Element Name
100 engine
101 vertical axis
102 cylinder block
104 cylinder heads
106 manifold
108 conduits
110 fastener-component sub-assembly
201 body
203 openings
207 fasteners
226 exterior surface
328 interior surface
405 retaining members
412 channel
414 wide portion
416 narrow portion
418 shoulder
520 axis
522 inlet
524 outlet
530 head
532 wall
534 outlet
800 method
802 step
804 step
806 step
808 step

The invention claimed is:

1. An engine comprising:
a cylinder block for housing one or more components of the engine;
a cylinder head connected to the cylinder block;
a manifold;
a conduit for fluidly connecting the cylinder head to the manifold; and a fastener-component sub-assembly for connecting the conduit to the manifold, the fastener-component sub-assembly including:
  a body having an interior surface, an exterior surface, and one or more openings extending from the interior surface to the exterior surface, wherein a first opening of the one or more openings includes an inlet and an outlet, wherein an axis extends through the inlet and the outlet,
  a retaining member disposed in the first opening of the one or more openings and in contact with an interior wall of the first opening that faces the axis extending through the inlet and the outlet of the first opening, wherein the retaining member is disposed between the inlet and the outlet of the first opening, and
  a fastener disposed in the first opening, the fastener comprising a narrow portion and a wide portion,
wherein a first width of the narrow portion is less than a second width of the wide portion,
wherein the fastener is movable within the first opening between an extended position and a recessed position,
wherein the first opening comprises a circumferential channel that extends into the interior wall of the first opening between the inlet and the outlet,
wherein the retaining member is disposed in the circumferential channel,
wherein the narrow portion of the fastener is sized such that the fastener is able to move along the axis through the retaining member, and
wherein the fastener includes a shoulder between the narrow portion and the wide portion, and the fastener is prevented from moving toward the inlet of the first opening when the shoulder abuts the retaining member in a direction parallel to the axis.

2. The engine according to claim 1, wherein the retaining member comprises an O-ring.

3. The engine according to claim 1, wherein the body comprises a flange.

4. The engine according to claim 1, wherein the body comprises a plate.

5. The engine according to claim 1, wherein a length of the narrow portion of the fastener is greater than a length of the wide portion of the fastener.

6. The engine according to claim 1, wherein the manifold is an exhaust manifold.

7. A fastener-component sub-assembly comprising:
a body having an interior surface, an exterior surface, and one or more openings extending from the interior surface to the exterior surface, wherein a first opening of the one or more openings include an inlet and an outlet, wherein an axis extends through the inlet and the outlet;
a retaining member disposed in a first opening of the one or more openings, wherein the retaining member is disposed between the inlet and the outlet of the first opening; and
a fastener disposed in the first opening, the fastener comprising a narrow portion and a wide portion,
wherein a first width of the narrow portion is less than a second width of the wide portion,
wherein the fastener is movable within the first opening between an extended position and a recessed position,
wherein the first opening comprises a circumferential channel that extends into a wall of the first opening between the inlet and the outlet,
wherein the retaining member is disposed in the circumferential channel,
wherein the narrow portion of the fastener is sized such that the fastener is able to move along the axis through the retaining member,
wherein the fastener includes a shoulder between the narrow portion and the wide portion, and the fastener is prevented from moving toward the inlet of the first opening when the shoulder abuts the retaining member in a direction parallel to the axis, and
wherein the retaining member is in direct contact with the narrow portion of the fastener at the extended position, at the recessed position, and at positions between the extended position and the recessed position.

8. The fastener-component sub-assembly according to claim 7, wherein the retaining member comprises an O-ring.

9. The fastener-component sub-assembly according to claim 7, wherein the body comprises a flange.

10. The fastener-component sub-assembly according to claim 7, wherein the body comprises a plate.

11. The fastener-component sub-assembly according to claim 7, wherein a length of the narrow portion of the fastener is greater than a length of the wide portion of the fastener.

12. A method of manufacturing a multi-component product, the method comprising:
providing a first component having a fastener-component sub-assembly, the fastener-component sub-assembly comprising:
  a body having an interior surface, an exterior surface, and one or more openings extending from the interior surface to the exterior surface, wherein a first opening of the one or more openings includes an inlet and an outlet, wherein an axis extends through the inlet and the outlet,
  a retaining member disposed in the first opening of the one or more openings and in contact with an interior wall of the first opening that faces the axis extending through the inlet and the outlet of the first opening, wherein the retaining member is disposed between the inlet and the outlet of the first opening, and
  a fastener disposed in the first opening such that the fastener is able to move through the first opening along the axis of the opening,
  wherein the fastener comprises a narrow portion, a wide portion, and a shoulder between the narrow portion and the wide portion,
  wherein the first opening comprises a circumferential channel that extends into the interior wall of the first opening between the inlet and the outlet,
  wherein the retaining member is disposed in the circumferential channel,
  wherein the fastener is disposed within the first opening such that the retaining member prevents movement of the fastener toward the inlet of the first opening when the shoulder of the fastener abuts the retaining member in a direction parallel to the axis, and
  wherein the fastener is movable within the first opening between an extended position and a recessed position;
providing a second component;
positioning the first component adjacent to the second component such that the body of the fastener-component sub-assembly is positioned to connect the first component to the second component, wherein the fastener is in the extended position; and connecting the fastener of the fastener-component sub-assembly of the first component to the second component to connect the first component to the second component, wherein the retaining member frictionally retains the narrow portion of the fastener in the extended position for said positioning the first component adjacent to the second component.

13. The method according to claim 12, wherein the retaining member of the fastener-component sub-assembly comprises an O-ring.

14. The method according to claim 12, wherein a length of the narrow portion of the fastener is greater than a length of the wide portion of the fastener.

15. The method according to claim 12, wherein the step of positioning the first component adjacent to the second component comprises positioning the first component adjacent to the second component such that the body of the fastener-component sub-assembly is positioned at a downward angle relative to a vertical axis of the multi-component product.

16. The method according to claim 12, wherein the multi-component product is an engine.

17. The method according to claim 16,
wherein the first component comprises a conduit,
wherein the second component comprises a manifold, and
wherein the fastener-component sub-assembly of the first component is connected to the second component such that the conduit is in fluid communication with the manifold.

* * * * *